US012608131B2

(12) United States Patent
Son et al.

(10) Patent No.: US 12,608,131 B2
(45) Date of Patent: Apr. 21, 2026

(54) STORAGE DEVICE AND MEMORY CONTROL DEVICE

(71) Applicant: SK hynix Inc., Gyeonggi-do (KR)

(72) Inventors: Jae Yong Son, Gyeonggi-do (KR);
Hong Sik Yun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 107 days.

(21) Appl. No.: 18/597,949

(22) Filed: Mar. 7, 2024

(65) Prior Publication Data

US 2025/0130717 A1 Apr. 24, 2025

(30) Foreign Application Priority Data

Oct. 19, 2023 (KR) ........................ 10-2023-0140166

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC .... G06F 3/0613; G06F 3/0659; G06F 3/0673; G11C 16/26

USPC ...................................... 365/189.011, 230.06
See application file for complete search history.

(56) References Cited

U.S. PATENT DOCUMENTS

| | | | | |
|---|---|---|---|---|
| 9,966,147 B1* | 5/2018 | Lien | ........................ | G11C 16/26 |
| 11,061,612 B2* | 7/2021 | Jean | ........................ | G06F 3/0688 |
| 2019/0235954 A1* | 8/2019 | Gim | .................... | G11C 11/5671 |
| 2023/0385151 A1* | 11/2023 | Kim | .................... | G06F 11/1048 |
| 2023/0402071 A1* | 12/2023 | Park | .................... | G11C 11/5671 |

FOREIGN PATENT DOCUMENTS

| | | |
|---|---|---|
| KR | 10-2017-0065076 A | 6/2017 |
| KR | 10-2023-0085625 A | 6/2023 |

* cited by examiner

*Primary Examiner* — Michael T Tran
(74) *Attorney, Agent, or Firm* — IP & T GROUP LLP

(57) ABSTRACT

An embodiment of the present disclosure may provide a read retry table optimized for a memory on the basis of a distribution of read voltages of word lines included in the corresponding memory, and by changing a method of setting a read retry table depending on the number of sample data, may provide an optimal read retry table even for a memory with insufficient sample data.

17 Claims, 11 Drawing Sheets

FIG.4A

| Cycle | Retention | Read Disturb | RR1 | RR2 | · · · |
|-------|-----------|--------------|-----|-----|-------|
| 1 | | | | | |
| 100 | | ⋮ | ⋮ | ⋮ | |
| 200 | | ⋮ | ⋮ | ⋮ | |
| ⋮ | | | | | |

FIG.4B

| Cycle | Retention | WL group | RR1 | RR2 | · · · |
|-------|-----------|----------|-----|-----|-------|
|  |  | Group 1 |  |  |  |
|  |  | Group 2 |  |  |  |
|  |  | Group 3 |  |  |  |
| 1 |  |  |  |  |  |
|  |  |  |  |  |  |
|  |  |  |  |  |  |
|  |  |  |  |  |  |
|  |  |  |  |  |  |
|  |  |  |  |  |  |
| 100 |  | ⋮ | ⋮ | ⋮ |  |
| 200 |  | ⋮ | ⋮ | ⋮ |  |
| ⋮ |  |  |  |  |  |

STORAGE DEVICE AND MEMORY CONTROL DEVICE

CROSS-REFERENCE TO RELATED APPLICATION

The present application claims priority under 35 U.S.C. § 119(a) to Korean Patent Application No. 10-2023-0140166 filed on Oct. 19, 2023, which is incorporated herein by reference in its entirety.

BACKGROUND

1. Technical Field

Various embodiments of the present disclosure generally relate to a storage device and a memory control device.

2. Related Art

A storage device may include a memory which includes a plurality of memory cells and stores data. The storage device may include a controller which controls the operation of the memory.

The controller may control an operation of writing data to the memory, reading data written to the memory, or erasing data written in the memory according to an external request or an internal operation.

When the controller performs an operation of reading data written to the memory, the read operation may be performed using a preset read voltage. In this case, the read operation based on the preset read voltage may not be normally performed due to a change in the characteristics of the memory.

SUMMARY

Various embodiments of the present disclosure are directed to providing measures capable of improving the performance of an operation of reading data written to a memory and a read retry operation performed when the read operation fails.

In an embodiment of the present disclosure, a storage device may include: a memory including a plurality of memory cells arranged between a plurality of word lines and a plurality of bit lines, and storing a read retry table; and a controller configured to control a read retry operation for the plurality of memory cells using the read retry table, the read retry table being determined using internal data and external data, wherein the internal data is determined based on read voltages of M number of word lines among the plurality of word lines, M being greater than or equal to 1 and wherein the external data is determined based on read voltages of at least N number of word lines included in each of a plurality of external memories, N being greater than M.

In an embodiment of the present disclosure, a storage device may include: a first memory including a plurality of first word lines, and a block in which a first read retry table is determined based on read voltages of M number of first word lines among the plurality of first word lines which are stored, M being greater than or equal to 1; and a second memory including a plurality of second word lines, and a block in which a second read retry table is determined based on read voltages of at least N number of second word lines among the plurality of second word lines which are stored, N being greater than M.

In an embodiment, a memory control device may include: a sample data reception unit configured to receive, from a memory or the outside, sample data for read voltages of K number of word lines, K being greater than or equal to 1; and an optimal read retry table generator configured to generate a read retry table for the memory including the K number of word lines on the basis of the sample data.

According to the embodiments of the present disclosure, it is possible to improve the performance of a read retry operation performed when a read operation for each memory included in a storage device fails.

These and other features and advantages of the invention will become apparent from the detailed description of embodiments of the present disclosure and the following figures.

BRIEF DESCRIPTION OF THE DRAWINGS

FIGS. 4A and 4B are diagrams illustrating other read retry tables which may be illustrated in FIG. 3.

DETAILED DESCRIPTION

Figure 1:
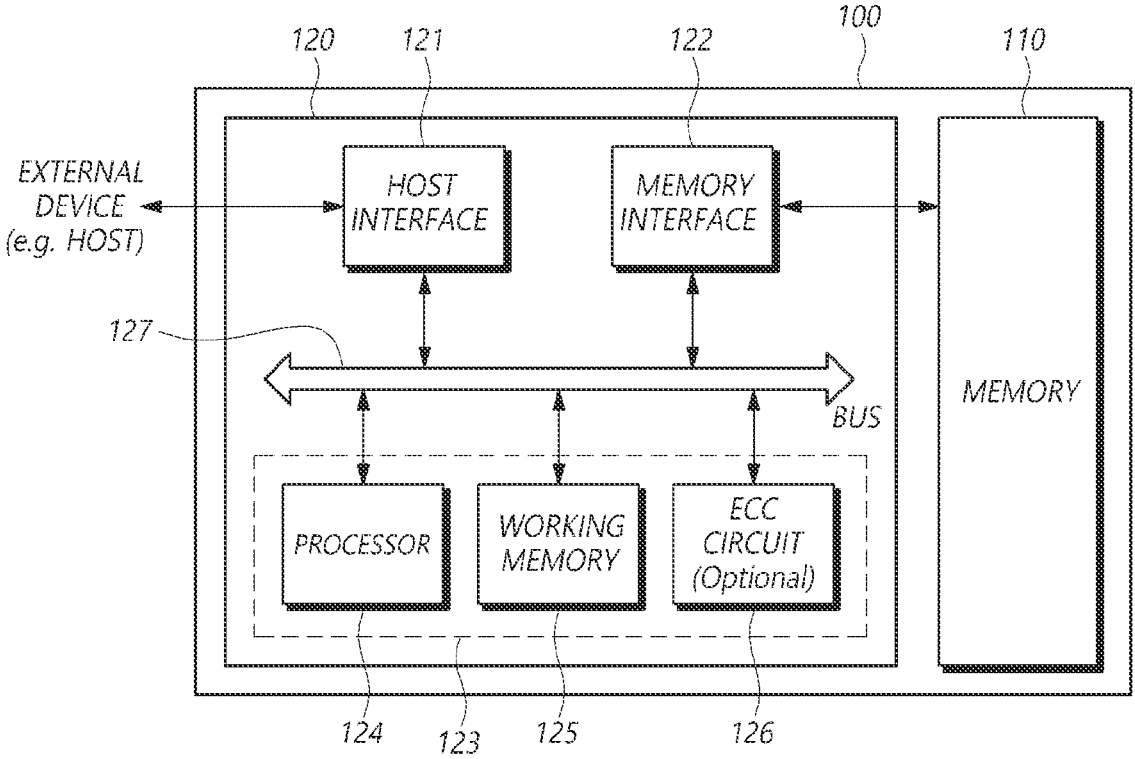
FIG. 1 is a diagram illustrating a schematic configuration of a storage device based on an embodiment of the present disclosure.

In the following description of embodiments of the present disclosure, reference will be made to the accompanying drawings in which it is shown by way of illustration specific examples of embodiments that can be implemented, and in which the same reference numerals and signs can be used to designate the same or like components even when they are shown in different accompanying drawings from one another. Further, in the following description of embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all meanings of the term "can".

Hereinafter, various embodiments of the present disclosure will be described in detail with reference to accompanying drawings.

Figure 2:
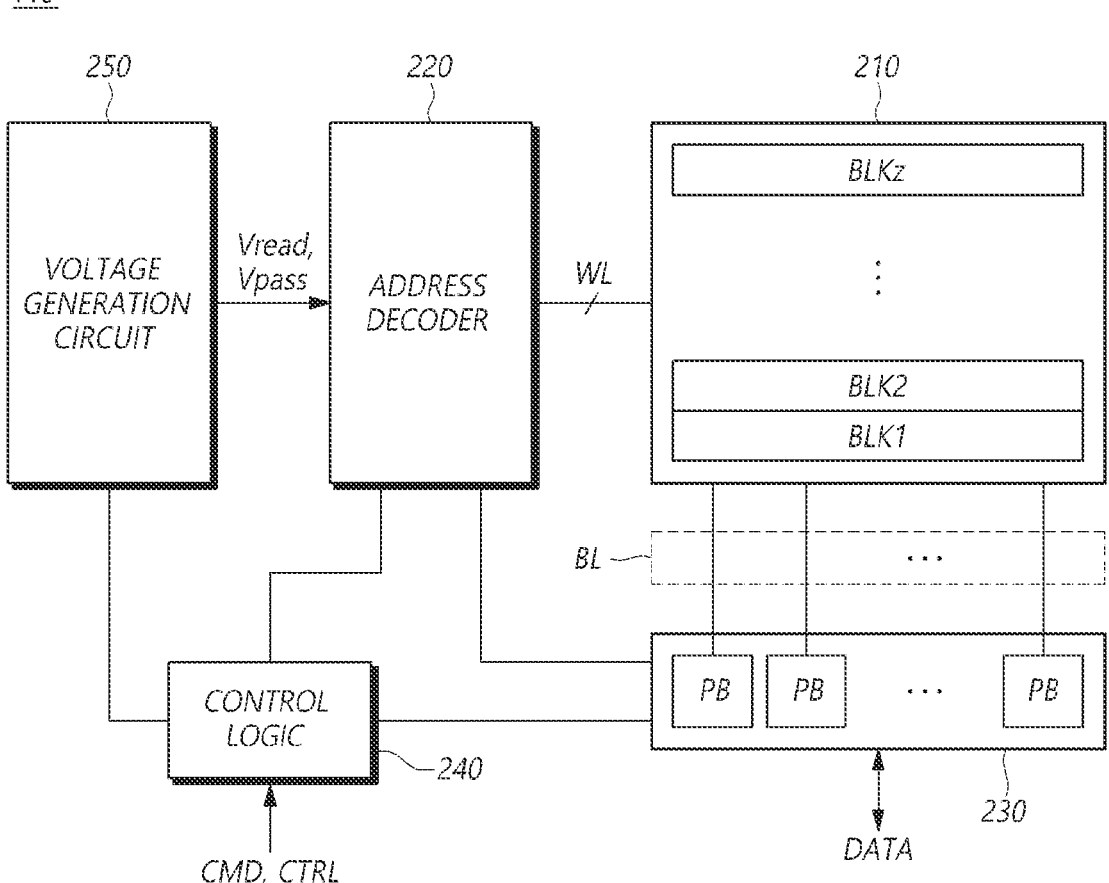
FIG. 2 is a diagram illustrating a schematic configuration of a memory illustrated in FIG. 1.

FIG. 1 is a diagram illustrating a schematic configuration of a storage device 100 based on an embodiment of the present disclosure. FIG. 2 is a diagram illustrating a schematic configuration of a memory 110 illustrated in FIG. 1.

Referring to FIG. 1, the storage device 100 may include a memory 110 which stores data, and a controller 120 which controls the memory 110.

The memory 110 may include a plurality of memory blocks and may operate in response to the control of the controller 120. Operations of the memory 110 may include, for example, a read operation, a program operation (or a write operation) and an erase operation.

The memory 110 may include a memory cell array including a plurality of memory cells which store data. Such a memory cell array may exist in a memory block.

The memory 110 may be a volatile memory or a nonvolatile memory. The memory 110 may be implemented as a three-dimensional array structure. An embodiment of the present disclosure may be applied to not only a flash memory in which a charge storage layer is configured by a floating gate but also a charge trap flash in which a charge storage layer is configured by an insulating film.

The memory 110 may receive a command, an address and so on from the controller 120, and may access an area which is selected by the address in the memory cell array. The memory 110 may perform an operation indicated by the command, on the area selected by the address.

The memory 110 may perform a program operation, a read operation and an erase operation. When performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. The background operation may include, for example, at least one of garbage collection, wear leveling, read reclaim and bad block management operations.

The controller 120 may control the operation of the memory 110 according to a request from a device (e.g., a host) located outside the storage device 100. Also, the controller 120 may control the operation of the memory 110 regardless of a request of the host.

The host may include at least one operating system. The operating system may generally manage and control the function and operation of the host, and may provide interoperability between the host and the storage device 100. The operating system may be classified into a general operating system and a mobile operating system depending on the mobility of the host.

The controller 120 and the host may be devices which are separated from each other. In some embodiments, the controller 120 and the host may be realized by being integrated into one device. Hereunder, for the sake of convenience, it will be described that the controller 120 and the host are devices which are separated from each other.

The controller 120 may include a host interface 121, a memory interface 122 and a control circuit 123.

The host interface 121 may provide an interface for communication with the host. When receiving a command from the host, the control circuit 123 may receive the command through the host interface 121, and may perform an operation of processing the received command.

The memory interface 122 may be coupled with the memory 110 to provide an interface for communication with the memory 110. The memory interface 122 may be configured to provide an interface between the memory 110 and the controller 120 in response to the control of the control circuit 123.

The control circuit 123 may perform the general control operation of the controller 120 to control the operation of the memory 110. The control circuit 123 may include a processor 124 and a working memory 125, and may optionally include an error detection and correction circuit 126.

The processor 124 may control the general operation of the controller 120, and may perform a logic calculation. The processor 124 may communicate with the host through the host interface 121, and may communicate with the memory 110 through the memory interface 122.

The processor 124 may perform the function of a flash translation layer. The processor 124 may translate a logical block address provided by the host into a physical block address through the flash translation layer. The flash translation layer may receive a logical block address and translate the logical block address into a physical block address using a mapping table.

There are various address mapping methods of the flash translation layer, depending on a mapping unit. Representative address mapping methods include a page mapping method, a block mapping method and a hybrid mapping method.

The processor 124 may execute firmware to control the operation of the controller 120. In order to control the general operation of the controller 120 and perform a logic calculation, the processor 124 may execute (drive) firmware loaded in the working memory 125 upon booting. Hereafter, an operation of the storage device 100 to be described based on an embodiment may be implemented in such a way that the processor 124 executes firmware in which the corresponding operation is defined.

Firmware, as a program to be executed in the storage device 100 to drive the storage device 100, may include various functional layers. For example, the firmware may include binary data in which codes for executing the respective functional layers are defined.

The firmware may include at least one of a flash translation layer, a host interface layer and a flash interface layer. The flash translation layer performs a translating function between a logical address requested to the storage device 100 from the host and a physical address of the memory 110. The host interface layer serves to analyze a command requested to the storage device 100 from the host and transfer the command to the flash translation layer. The flash interface layer transfers, to the memory 110, a command, instructed from the flash translation layer.

The firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic operation which is defined in the firmware loaded in the working memory 125, to control the general operation of the controller 120. The processor 124 may store a result of performing the logic operation defined in the firmware, in the working memory 125. The processor 124 may control the controller 120 to generate a command or a signal, according to a result of performing the logic operation defined in the firmware. When a part of firmware in which a logic operation to be performed is defined, is not loaded in the working memory 125, the processor 124 may generate an event (e.g., an interrupt) for loading the corresponding part of the firmware in the working memory 125.

The processor 124 may load metadata necessary for driving firmware, from the memory 110. The metadata, as data for managing the memory 110, may include management information on user data stored in the memory 110.

The working memory 125 may store firmware, a program code, a command and data which are necessary to drive the controller 120. The working memory 125 as, for example, a volatile memory may include at least one of an SRAM, a DRAM and an SDRAM.

The error detection and correction circuit 126 may detect an error bit of target data and correct the detected error bit, by using an error correction code. The target data may be, for example, data stored in the working memory 125 or data read from the memory 110.

The error detection and correction circuit 126 may be implemented to decode data using an error correction code. The error detection and correction circuit 126 may be implemented by various code decoders. For example, a decoder which performs unsystematic code decoding or a decoder which performs systematic code decoding may be used.

A bus 127 may be configured to provide channels among the components 121, 122, 124, 125 and 126 of the controller 120. The bus 127 may include, for example, a control bus for transferring various control signals, commands and the likes, a data bus for transferring various data, and so forth.

Some components among the above-described components 121, 122, 124, 125 and 126 of the controller 120 may be omitted or may be integrated into one. In some embodiments, in addition to the above-described components 121, 122, 124, 125 and 126 of the controller 120, one or more other components may be added.

Hereinbelow, the memory 110 will be described in further detail with reference to FIG. 2.

Referring to FIG. 2, the memory 110 may include a memory cell array 210, an address decoder 220, a read and write circuit 230, a control logic 240 and a voltage generation circuit 250.

The memory cell array 210 may include a plurality of memory blocks BLK1 to BLKz, where z is a natural number of 2 or greater.

The plurality of memory blocks BLK1 to BLKz may be disposed between a plurality of word lines WL and a plurality of bit lines BL, and each memory block may include a plurality of memory cells arranged therein.

The plurality of memory blocks BLK1 to BLKz may be coupled to the address decoder 220 through the plurality of word lines WL. The plurality of memory blocks BLK1 to BLKz may be coupled to the read and write circuit 230 through the plurality of bit lines BL.

Each of the plurality of memory blocks BLK1 to BLKz may include a plurality of memory cells. The plurality of memory cells may be nonvolatile memory cells, and may be configured by nonvolatile memory cells which have vertical channel structures.

The memory cell array 210 may be configured by a memory cell array of a two-dimensional structure, or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) which stores 1-bit data. For another instance, each of the plurality of memory cells included in the memory cell array 210 may be a multi-level cell (MLC) which stores 2-bit data. For still another instance, each of the plurality of memory cells included in the memory cell array 210 may be a triple level cell (TLC) which stores 3-bit data. For yet another instance, each of the plurality of memory cells included in the memory cell array 210 may be a quad level cell (QLC) which stores 4-bit data. For still yet another instance, the memory cell array 210 may include a plurality of memory cells, each of which stores 5 or more-bit data.

The number of bits of data stored in each of the plurality of memory cells may be dynamically determined. For example, a single-level cell which stores 1-bit data may be changed to a triple-level cell which stores 3-bit data.

The address decoder 220, the read and writhe circuit 230, the control logic 240 and the voltage generation circuit 250 may operate as a peripheral circuit which drives the memory cell array 210.

The address decoder 220 may be coupled to the memory cell array 210 through the plurality of word lines WL. The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block of the memory cell array 210 according to the decoded block address.

The address decoder 220 may receive a read voltage Vread and a pass voltage Vpass from the voltage generation circuit 250.

In a read voltage applying operation during a read operation, the address decoder 220 may apply the read voltage Vread to a selected word line WL in a selected memory block, and may apply the pass voltage Vpass to the remaining unselected word lines WL.

In a program verify operation, the address decoder 220 may apply a verify voltage generated by the voltage generation circuit 250 to a selected word line WL of a selected memory block, and may apply the pass voltage Vpass to the remaining unselected word lines WL of the selected memory block.

The address decoder 220 may be configured to decode a column address in the received address. The address decoder 220 may transmit the decoded column address to the read and write circuit 230.

A read operation and a program operation of the memory 110 may be performed by the unit of a page. An address received along with a request of a read operation or a program operation may include at least one of a block address, a row address and a column address.

The address decoder 220 may select one memory block and one word line WL depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit for a read operation of the memory cell array 210, and may operate as a write circuit for a write operation of the memory cell array 210.

The read and write circuit 230 may also be referred to as a page buffer circuit which includes a plurality of page buffers PB or a data register circuit. The read and write circuit 230 may include data buffers which take charge of a data processing function, and in some embodiments, may further include cache buffers which take charge of a caching function.

The plurality of page buffers PB may be coupled to the memory cell array 210 through the plurality of bit lines BL. In a read operation and a program verify operation, the plurality of page buffers PB may continuously supply sensing current to bit lines BL coupled with memory cells to sense threshold voltages (Vth) of the memory cells, and may latch sensing data by sensing, through sensing nodes, that the amounts of current flowing depending on the pro-grammed states of the corresponding memory cells are changed.

The read and write circuit 230 may operate in response to page buffer control signals outputted from the control logic 240.

In a read operation, the read and write circuit 230 tem-porarily stores read data by sensing data of memory cells, and then, outputs the read data to the input/output buffer of the memory 110. In an embodiment, the read and write circuit 230 may include a column select circuit and so forth in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. A memory cell which is coupled to one of the plurality of word lines WL and one of the plurality of bit lines BL may be defined. A transistor may be disposed in each memory cell.

The transistor disposed in the memory cell may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate which is surrounded by a dielectric and a control gate to which a gate voltage is applied from a word line WL.

Each memory block may include a first select line (also referred to as a source select line or a drain select line) and a second select line (also referred to as a drain select line or a source select line). The first select line may be additionally disposed outside a first outermost word line WL more adjacent to the read and write circuit 230 between two outermost word lines WL. The second select line may be additionally disposed outside a second outermost word line WL between the two outermost word lines WL.

In some embodiments, at least one dummy word line may be additionally disposed between the first outermost word line and the first select line. At least one dummy word line may also be additionally disposed between the second outermost word line and the second select line.

A read operation and a program operation (write opera-tion) of the memory block described above may be per-formed by the unit of a page, whereas an erase operation may be performed by the unit of a memory block.

In a read operation for the memory 110, the read operation by a preset read voltage Vread may not be normally per-formed due to a change in the characteristics of a memory cell. In this case, a read operation may be performed by changing the read voltage Vread.

Embodiments of the present disclosure may provide a scheme in which a read retry value for performing a read retry operation is set to an optimal value for the memory 110, thereby providing measures capable of improving the per-formance of a read operation for the memory 110.

Figure 3:
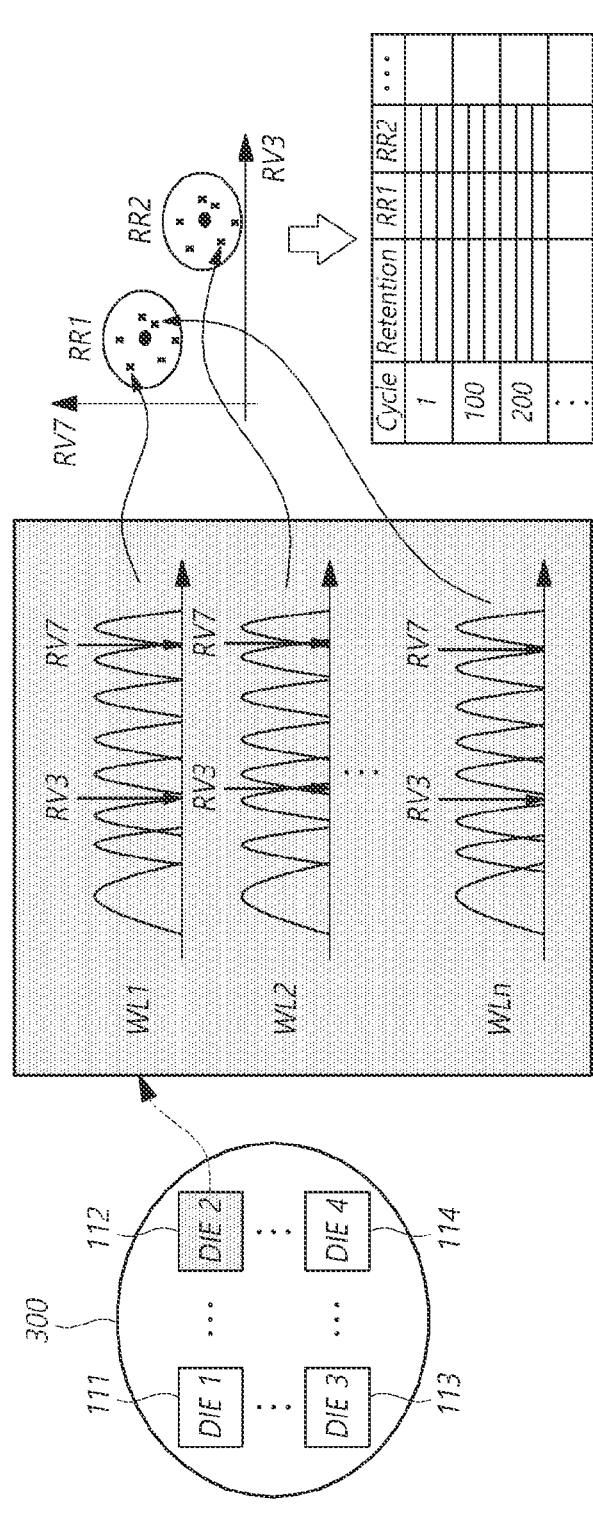
FIG. 3 is a diagram illustrating a method in which a read retry table of the storage device is generated based on the embodiment of the present disclosure.

FIG. 3 is a diagram illustrating a method in which a read retry table of the storage device 100 is generated based on the embodiment of the present disclosure. FIGS. 4A and 4B are diagrams illustrating other read retry tables which may be illustrated in FIG. 3.

Referring to FIG. 3, a plurality of memories 111, 112, 113 and 114 (collectively referred to as 110) may be obtained from the same wafer 300. FIG. 3 illustrates, as an example, four memories 111, 112, 113 and 114, each memory includ-ing one memory die.

The characteristics of the plurality of memories 110 obtained from the same wafer 300 may not be the same as each other. When the same read retry table is applied to the plurality of memories 110, the efficiency of a read retry operation may be different in each memory 110. An embodi-ment of the present disclosure may provide a method of setting a read retry table in consideration of the character-istics of read voltages of each of the plurality of memories 110. The read retry table set in this method may be referred to as an optimal read retry table.

For example, read retry values may be set based on read voltages of a plurality of word lines WL included in each of the plurality of memories 110. FIG. 3 illustrates read voltage distributions when each memory cell included in the memory 110 stores 3-bit data. FIG. 3 illustrates, as an example, a case of checking distributions of a third read voltage RV3 and a seventh read voltage RV7 used when reading data of a least significant bit (LSB) page among 3-bit data of each memory cell.

Describing a second memory 112 by way of example, the second memory 112 may include N number of word lines WL or more than N number of word lines WL. There may be deviations between the word lines WL included in the second memory 112. The third read voltage RV3 and the seventh read voltage RV7 for each word line WL may be checked.

Read voltages of a first word line WL1 to an Nth word line WLn may be checked. According to the distribution of read voltages, a read voltage positioned at the center of a region where a largest number of read voltages are distributed may be set as a first read retry value RR1. A read voltage positioned at the center of a region where a second largest number of read voltages are distributed may be set as a second read retry value RR2.

Read retry values may be set on the basis of the distribution of read voltages of the N number of word lines WL included in the second memory 112. Since read retry values are set on the basis of the distribution of read voltages of the word lines WL included in each memory 110, the efficiency of a read retry operation using a read retry table in which the corresponding read retry values are set for each memory 110 may be improved.

For example, optimal read retry values capable of covering all word lines WL or as many as possible word lines WL of a corresponding memory 110 may be derived through a machine learning algorithm, e.g., K-means clustering or neural network-based clustering, etc. As shown in FIG. 3, when clustering is performed, the center of each cluster may be derived as a read retry value. The number of read retry values may be determined in correspondence to the number of clusters.

Similarly, to the case of the second memory 112, read retry values on which the characteristics of each memory 110 are reflected may be derived on the basis of the distribution of read voltages of the word lines WL included in each of a first memory 111, a third memory 113 and a fourth memory 114. A read retry table including the derived read retry values may be generated. The generated read retry table may be stored in a block included in each memory 110.

For each memory 110 having different characteristics, a read retry table on which the characteristics of the corresponding memory 110 are reflected may be set. By using the read retry table, the efficiency of a read retry operation for each memory 110 may be improved.

Read retry values included in a read retry table may be set for a plurality of conditions.

For example, read retry values may be set for each of a plurality of first conditions. In addition, read retry values may be set for each of a plurality of second conditions. The plurality of first conditions and the plurality of second conditions may correspond one to one. Alternatively, each of the plurality of first conditions may correspond to at least two second conditions.

Read retry values may be set for each of the plurality of first conditions and each of the plurality of second conditions set for each of the plurality of first conditions.

For example, the plurality of first conditions may be the numbers of cycles. Here, a cycle means a cycle of a write operation. The number of cycles means the number that the write operation is performed for the memory cell. For example, the plurality of second conditions may be retention periods.

At least two retention periods may correspond to each of a plurality of numbers of cycles.

A read retry table in which an optimal read retry value is set for a number of cycles and a retention period may be generated.

The read retry table may be stored in a block included in each memory 110. The controller 120 may perform a read retry operation for the corresponding memory 110 by using the read retry table stored in the block of the memory 110.

Since a read retry operation is performed for each memory 110 by using a read retry table in which optimal read retry values are set, it is possible to prevent the performance of the read retry operation from degrading due to deviations between memories 110.

The read retry values of a read retry table may be set for each of at least two conditions, or may be set for each of at least three conditions.

In FIG. 4A, a read retry table may include read retry values which are set for each of a plurality of first conditions, each of a plurality of second conditions corresponding to each of the plurality of first conditions and each of a plurality of third conditions corresponding to each of the plurality of second conditions.

For example, each first condition may be a number of cycles. For example, each second condition may be a retention period. For example, each third condition may be a number of read disturbances.

Each of the read retry values may be set for a number of cycles, a retention period and a number of read disturbances.

In other embodiments, at least one condition, e.g., an amount of change in threshold voltage according to a temperature, may be further added to provide a read retry table in which read retry values are set for a plurality of conditions.

Since optimal read retry values derived for each memory (e.g., die) are set and provided for respective conditions, a read retry operation based on a read retry table stored in each memory 110 may be performed to improve the performance of the read retry operation.

Furthermore, a read retry table may be generated by deriving optimal read retry values for a group having a similar characteristic distribution even in a memory 110.

In FIG. 4B, at least two retention periods may correspond to each cycle. At least two word line groups may correspond to a retention period. As shown in FIG. 4B, 3 retention periods correspond to each cycle, and 3 word line groups correspond to a retention period.

In an embodiment, a word line group may include at least two word lines WL having a similar characteristic distribution among the plurality of word lines WL. Above at least two word lines WL having a similar characteristic distribution may be positioned adjacent to each other or to be separated from each other. Alternatively, a word line group may include at least two adjacent word lines WL.

A read retry table may be generated as optimal read retry values are derived and set for each cycle, each retention period and each word line group.

Since read retry values set for each word line group having a similar characteristic distribution are applied, degradation in the performance of a read retry operation due to a deviation in characteristics between word lines WL even in the memory 110 may be decreased.

A word line group is an example, and a group for which read retry values are set in a memory 110 may be set in various ways. For example, read retry values may be set for each memory block group including at least two memory blocks included in the memory 110. Alternatively, read retry values may be set for each page group including at least two pages.

In the process of deriving optimal read retry values for each memory, e.g., memory die, read retry values may be derived for each group having similar characteristics in the memory 110, such as a word line group or a memory block group. A read retry operation may be performed according to read retry values on which deviations in characteristics inside the memory 110 as well as deviations in characteristics between dies are reflected.

Even when read retry values are set for each word line group or each memory block group, a read retry table in which read retry values are set for each of at least three conditions may be provided.

Moreover, in some embodiments, read retry values for a combination of conditions not included in a read retry table may be derived to be applied to a read retry operation.

For example, read retry values for a number of cycles between the numbers of cycles 100 and 200 may be calculated on the basis of read retry values set for the numbers of cycles 100 and 200 to be applied to a read retry operation. Alternatively, read retry values for a retention period not set for the number of cycles 1 may be derived and applied on the basis of read retry values set for combinations of a number of cycles and retention periods.

Since a read retry operation based on a read retry table in which optimal read retry values are set for each memory 110 is performed, it is possible to prevent the performance of the read retry operation from degrading due to deviations in the characteristics of dies.

In addition, read retry values for a combination of unset conditions may be calculated through learning for changes in set read retry values to be applied to a read retry operation.

In this way, a method in which an optimal read retry table is set on the basis of the distribution of read voltages of the word lines WL included in each memory 110 may be referred to as a learning method. When sample data according to a distribution of read voltages of the word lines WL included in the memory 110 is sufficient, an optimal read retry table for the corresponding memory 110 may be derived through the learning method.

When sample data according to a distribution of read voltages of the word lines WL included in the memory 110 is not sufficient, it may not be easy to derive an optimal read retry table by the learning method.

An embodiment of the present disclosure may provide a method capable of setting an optimal read retry table suitable for the characteristics of the memory 110 even when sample data according to a distribution of read voltages of the word lines WL included in the corresponding memory 110 is not sufficient.

A method of setting an optimal read retry table when sample data according to a distribution of read voltages of the word lines WL included in the memory 110 is not sufficient may be referred to as a test method.

FIGS. 5 to 9 are diagrams illustrating other methods in which a read retry table of the storage device 100 is generated based on an embodiment of the present disclosure.

Figure 5:
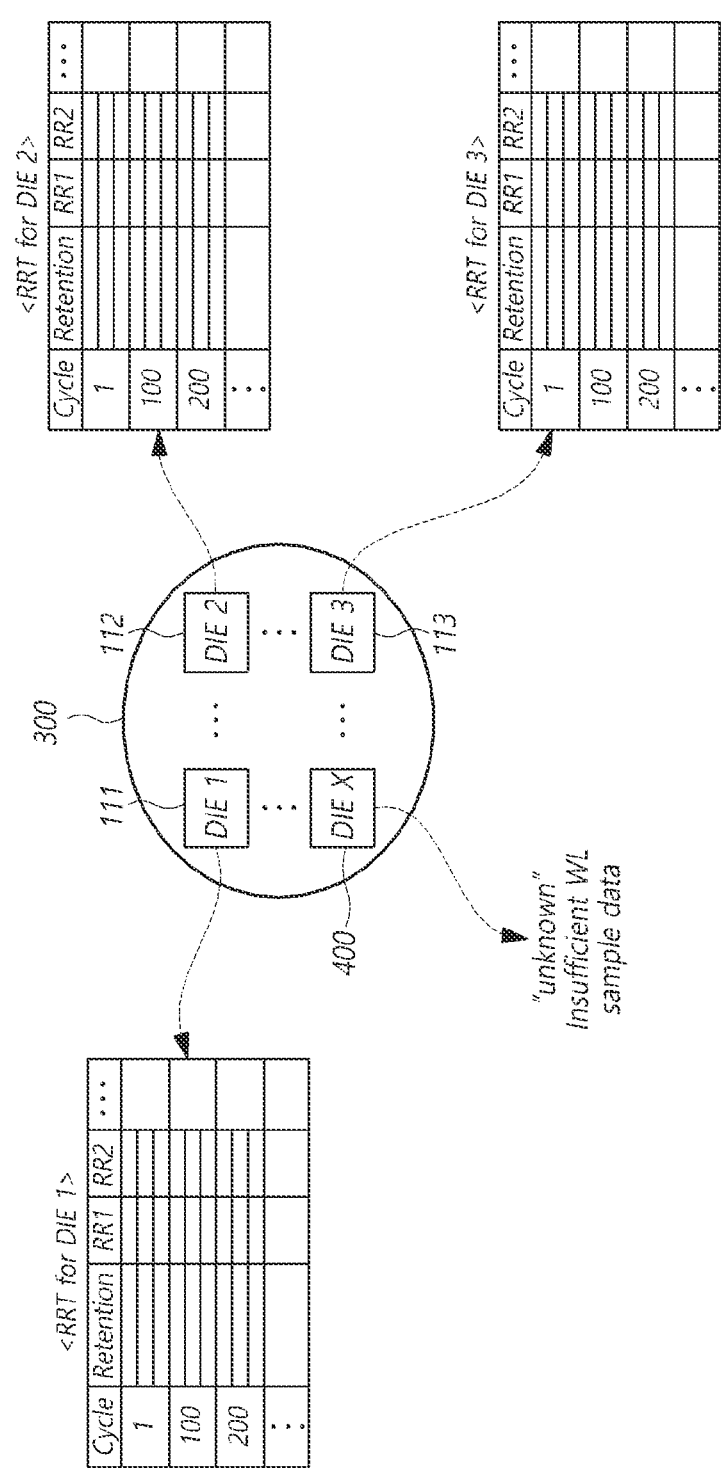
FIGS. 5 to 9 are diagrams illustrating other methods in which a read retry table of the storage device is generated based on the embodiment of the present disclosure.

Referring to FIG. 5, four memories 111, 112, 113 and 400 (collectively referred to as 110) obtained from the same wafer 300 are illustrated as an example. As shown in FIG. 5, each memory may include one memory die. An embodiment of the present disclosure may be applied between memories 110 obtained from the same wafer 300 or different wafers.

FIG. 5 illustrates a case where sample data for read voltages of word lines WL for some memories among the memories 110 obtained from the wafer 300 is sufficiently secured and sample data for read voltages of word lines WL for the other some memories 110 is not sufficiently obtained.

In FIG. 5, sample data for read voltages of word lines WL included in each of a first memory 111, a second memory 112 and a third memory 113 may be sufficiently secured. As sample data for read voltages of at least N number of word lines WL included in each of the first memory 111, the second memory 112 and the third memory 113 is secured, a read retry table may be generated on the basis of the corresponding sample data.

An optimal read retry table may be generated on the basis of a distribution of read voltages of word lines WL for each of the first memory 111, the second memory 112 and the third memory 113. A read retry table may be one of the examples of read retry tables described above.

Unlike the first memory 111, the second memory 112 and the third memory 113, there may be a memory 110 for which sample data for read voltages of word lines WL is not sufficiently secured. The insufficiently secured memory 110 may be referred to as a test memory 400, e.g., the memory die X of FIG. 5.

The number of sample data for read voltages of the word lines WL included in the test memory 400 may be less than the numbers of sample data secured for the first memory 111. The accuracy of a read retry table which may be generated on the basis of the sample data secured for the test memory 400 may not be high.

An embodiment of the present disclosure may generate an optimal read retry table for the test memory 400 using distribution characteristics of read voltages of the word lines WL included in the test memory 400, and read retry tables of other memories 110 in which the read retry tables are generated on the basis of sufficient sample data. Alternatively, an optimal read retry table of the test memory 400 may be generated using sample data of memories 110 for which sample data for read voltages of word lines WL is sufficiently secured to enable generation of read retry tables.

Even when sample data for read voltages of word lines WL included in each memory 110 is not sufficient, a read retry table optimized for the corresponding memory 110 may be provided.

A method of generating an optimal read retry table for the test memory 400 may be various as shown in FIGS. 6 to 9.

Figure 6:
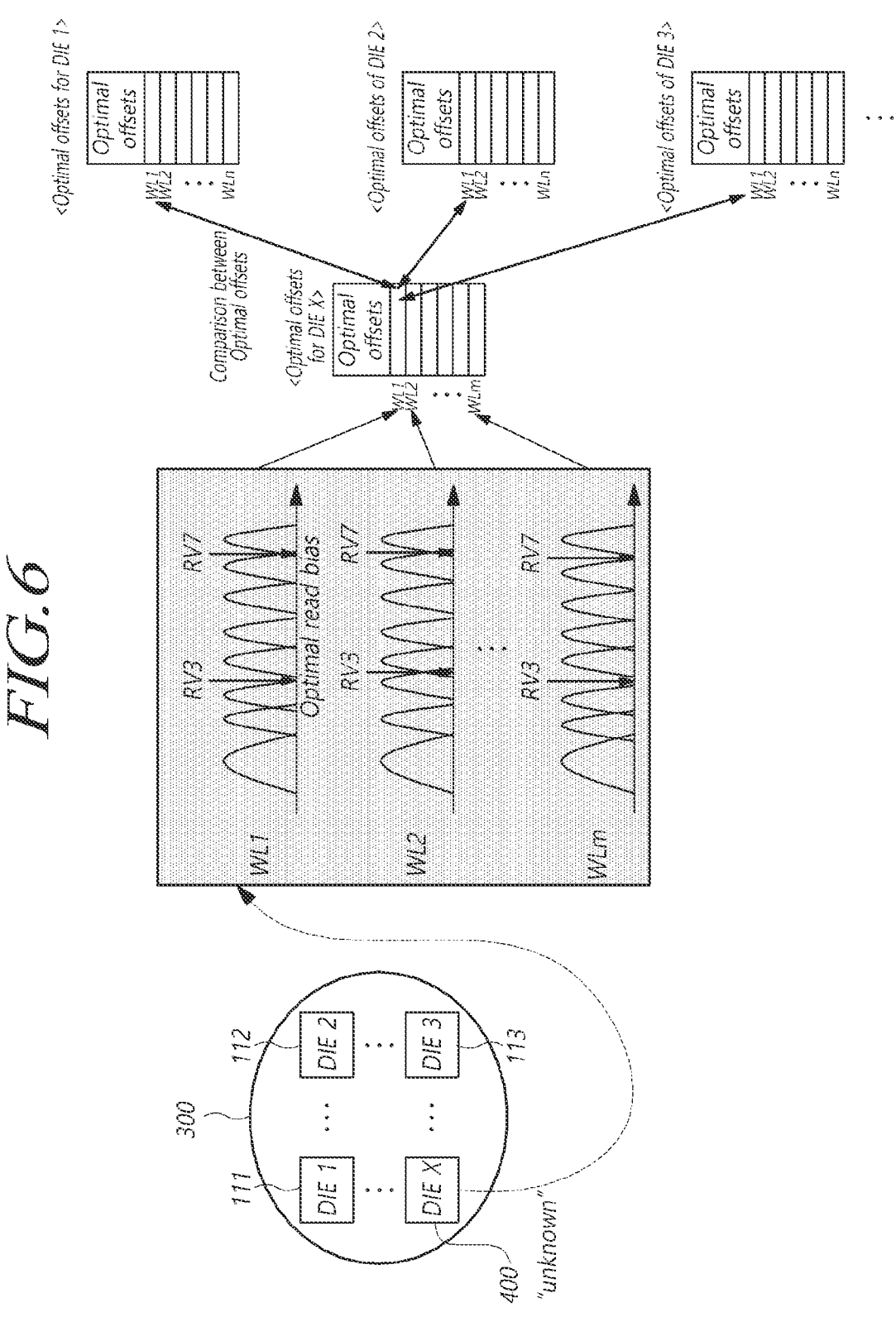

In FIG. 6, an optimal read retry table for the test memory 400 may be generated using sample data for a distribution of read voltages of the word lines WL of the test memory 400 and sample data for distributions of read voltages of the word lines WL of other memories 111 to 113.

A first memory 111, a second memory 112 and a third memory 113 represent a case where sample data of read voltages of the word lines WL included in a corresponding memory 110 is sufficient. For example, sample data of read voltages of at least N number of word lines WL included in each of the first memory 111, the second memory 112 and the third memory 113 may be provided. Sample data of a read voltage may be expressed by an offset value with respect to a basic value.

Sample data of read voltages of the word lines WL included in the test memory 400 may be provided. Sample data of read voltages of M number of word lines WL included in the test memory 400 may be provided. In one embodiment, M may be a value less than N.

An offset value according to the read voltage of a first word line WL1 included in the test memory 400, an offset value according to the read voltage of a second word line WL2, . . . and an offset value according to the read voltage of an Mth word line WLm may be provided. Some of the first word line WL1, the second word line WL2 and the Mth word line WLm may be continuous or may not be continuous.

The offset values of read voltages of the word lines WL included in the test memory 400 may be compared with the offset values of read voltages of the word lines WL included in each of the first memory 111, the second memory 112 and the third memory 113. Although a case where three memories 110 as targets to be compared with the test memory 400 are described as an example, the number of memories 110 as comparison targets is not limited.

On the basis of the differences between the offset values of read voltages of the word lines WL included in the test memory 400 and the offset values of read voltages of the word lines WL included in the first memory 111, the read retry table of the test memory 400 may be set.

For example, on the basis of the average values or the maximum values of the Euclidean distances between the offset values of read voltages of the word lines WL included in the test memory 400 and the offset values of read voltages of the word lines WL included in the first memory 111, the read retry table of the test memory 400 may be set.

The read retry table of the memory 110 in which the average values or the maximum values of the Euclidean distances between the test memory 400 and remaining memories such as the first memory 111, the second memory 112 and the third memory 113 are minimum may be set as an optimal read retry table for the test memory 400.

For example, when the average values of the Euclidean distances between the test memory 400 and the first memory 111 are minimum, a read retry table set for the first memory 111 may be set as the read retry table of the test memory 400. The read retry table of the test memory 400 may be the same as the read retry table of the first memory 111, and may be different from the read retry table of the second memory 112 and the read retry table of the third memory 113.

The distributions of read voltages of memories 110 in which the Euclidean distances between offset values of read voltages of the word lines WL of the memories 110 are minimum may be regarded as similar. When sample data of read voltages of the word lines WL is not sufficient as in the test memory 400, a read retry table which is generated for the memory 110 whose distribution of read voltages of the word lines WL is most similar and is set on the basis of sufficient sample data may be set as the read retry table of the test memory 400. The performance of a read retry operation based on the read retry table for the test memory 400 may be improved.

When comparing the distribution of read voltages of the word lines WL of the test memory 400 and the distributions of read voltages of the word lines WL of the first memory 111, comparison may be made between word lines WL located at the same layer.

For example, an offset value for a pth word line WLp among the offset values of read voltages of the M number of word lines WL included in the test memory 400 and offset values for qth word lines WLq among the offset values of read voltages of the N numbers of word lines WL included in the first memory 111 may be compared with each other. A layer where the pth word line WLp is disposed in the test memory 400 may be the same as a layer where the qth word lines WLq are disposed in the first memory 111. For example, the offset value of a read voltage of the first word line WL1 of the test memory 400 and the offset value of a read voltage of the first word line WL1 of each of the first memory 111, the second memory 112 and the third memory 113 may be compared.

A read voltage of a word line WL of the test memory 400 may be compared with a read voltage of a word line WL located at the same layer in each of the first memory 111, the second memory 112 and the third memory 113 as a layer where the corresponding word line WL of the test memory 400 is disposed. Since the offset values of read voltages of word lines WL which are located at the same layer in the wafer 300 and thus have similar characteristics are compared, the memory 110 which has a characteristic distribution similar to the test memory 400 may be easily selected.

In this way, according to a result of comparing the offset values of read voltages of the M number of word lines WL of the test memory 400 and the offset values of each of the first memory 111, the second memory 112 and the third memory 113 in each of which the offset values of read voltages of the at least N number of word lines WL are secured, one of read retry tables set for the first memory 111, the second memory 112 and the third memory 113 may be set as the read retry table of the test memory 400.

Alternatively, by comparison of read retry tables between the test memory 440 and the first memory 111, an optimal read retry table for the test memory 400 may be set.

Figure 7:
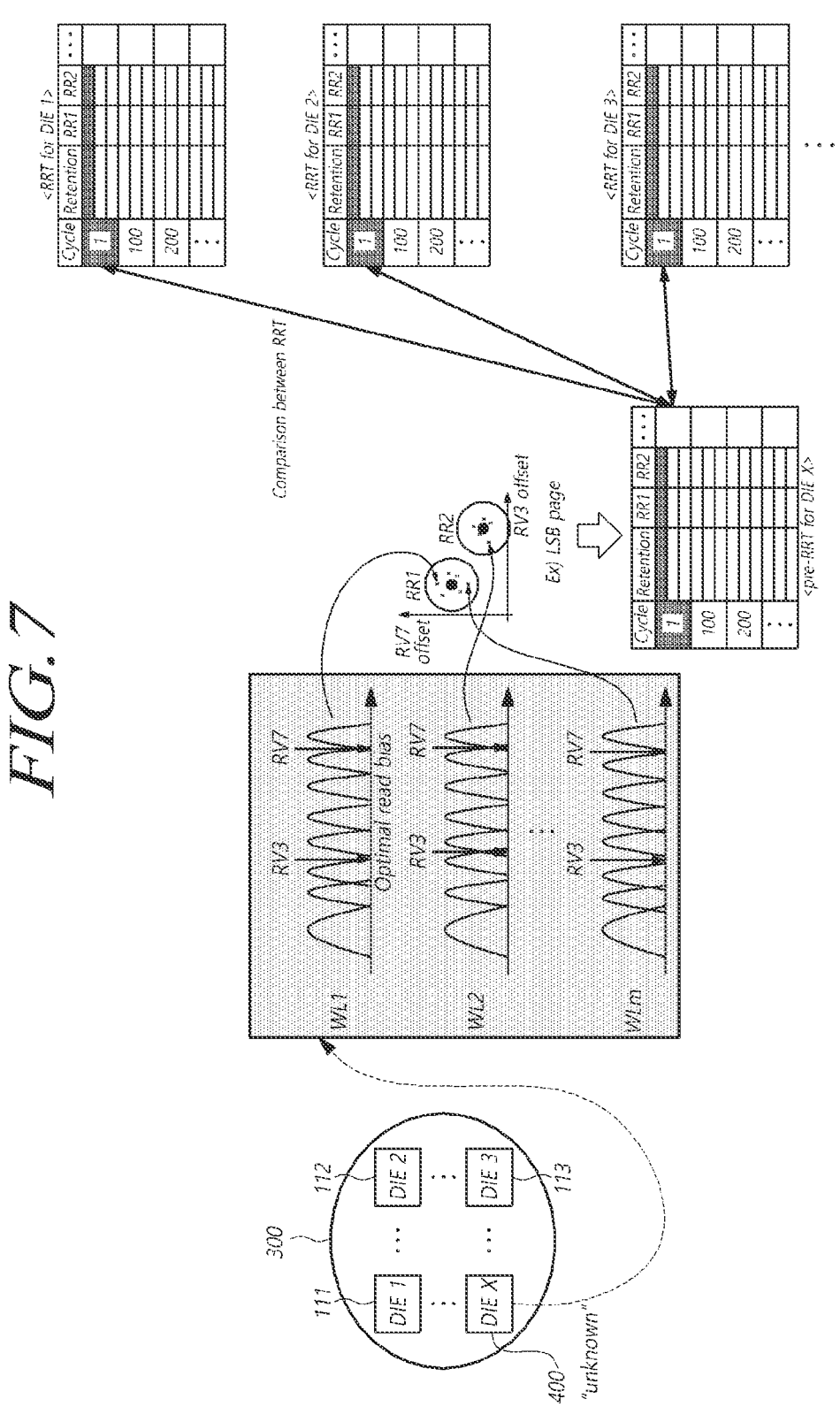

In FIG. 7, on the basis of sample data of read voltages of the at least N number of word lines WL included in the first memory 111, an optimal read retry table for the first memory 111 may be set. The optimal read retry table of the first memory 111 may be referred to as a first external read retry table. Similarly, a second external read retry table and a third external read retry table may be set for the second memory 112 and the third memory 113, respectively, for which sufficient sample data is secured.

Sample data of read voltages of the M number of word lines WL included in the test memory 400 may be secured. A pre-read retry table may be set on the basis of the sample data of read voltages of the M number of word lines WL.

The pre-read retry table of the test memory 400 may be a read retry table which is set on the basis of M number of sample data.

The pre-read retry table may be set similarly to the above-described method of setting a read retry table. Clustering may be performed for read voltages of the M number of word lines WL. According to a distribution of read voltages, a read voltage positioned at the center of a region where a largest number of read voltages are distributed may be determined as a read retry value, and a pre-read retry table may be set.

Since the pre-read retry table is set on the basis of a distribution of read voltages of the M number of word lines WL which are not sufficient, the accuracy of a read retry operation may not be high.

The pre-read retry table may be used to set an optimal read retry table for the test memory 400. The pre-read retry table may be compared with external read retry tables set for the first memory 111.

For example, the average values or the maximum values of the Euclidean distances between read retry values included in the pre-read retry table and read retry values included in the external read retry tables set for the first memory 111 may be calculated.

The Euclidean distances between read retry values corresponding to the same condition in the pre-read retry table of the test memory 400 and the external read retry table of another memory 110 may be calculated.

For example, a first read retry value RR1 and a second read retry value RR2 set for the number of cycles of 1 and a first retention period in the pre-read retry table may be compared with a first read retry value RR1 and a second read retry value RR2 set for the number of cycles of 1 and a first retention period in the first external read retry table for the first memory 111.

The average values or the maximum values of the Euclidean distances between read retry values of the pre-read retry table and read retry values of an external read retry table for the same condition may be calculated. An external read retry table in which the average values or the maximum values of the Euclidean distances are minimum may be set as an optimal read retry table for the test memory 400.

The pre-read retry table of the test memory 400 may be used to select the memory 110 which has distribution characteristics similar to a distribution of read voltages of the word lines WL of the test memory 400, and an optimal read retry table for the test memory 400 may be set through comparison between the pre-read retry table and the external read retry tables.

One of the external read retry tables for the first memory 1110, the second memory 112 and the third memory 113, respectively, may be set as an optimal read retry table for the test memory 400.

Alternatively, without generating the pre-read retry table of the test memory 400, through comparison between a distribution of read voltages of the word lines WL of the test memory 400 and the external read retry table of each of other memories 110, an optimal read retry table for the test memory 400 may be set.

Figure 8:
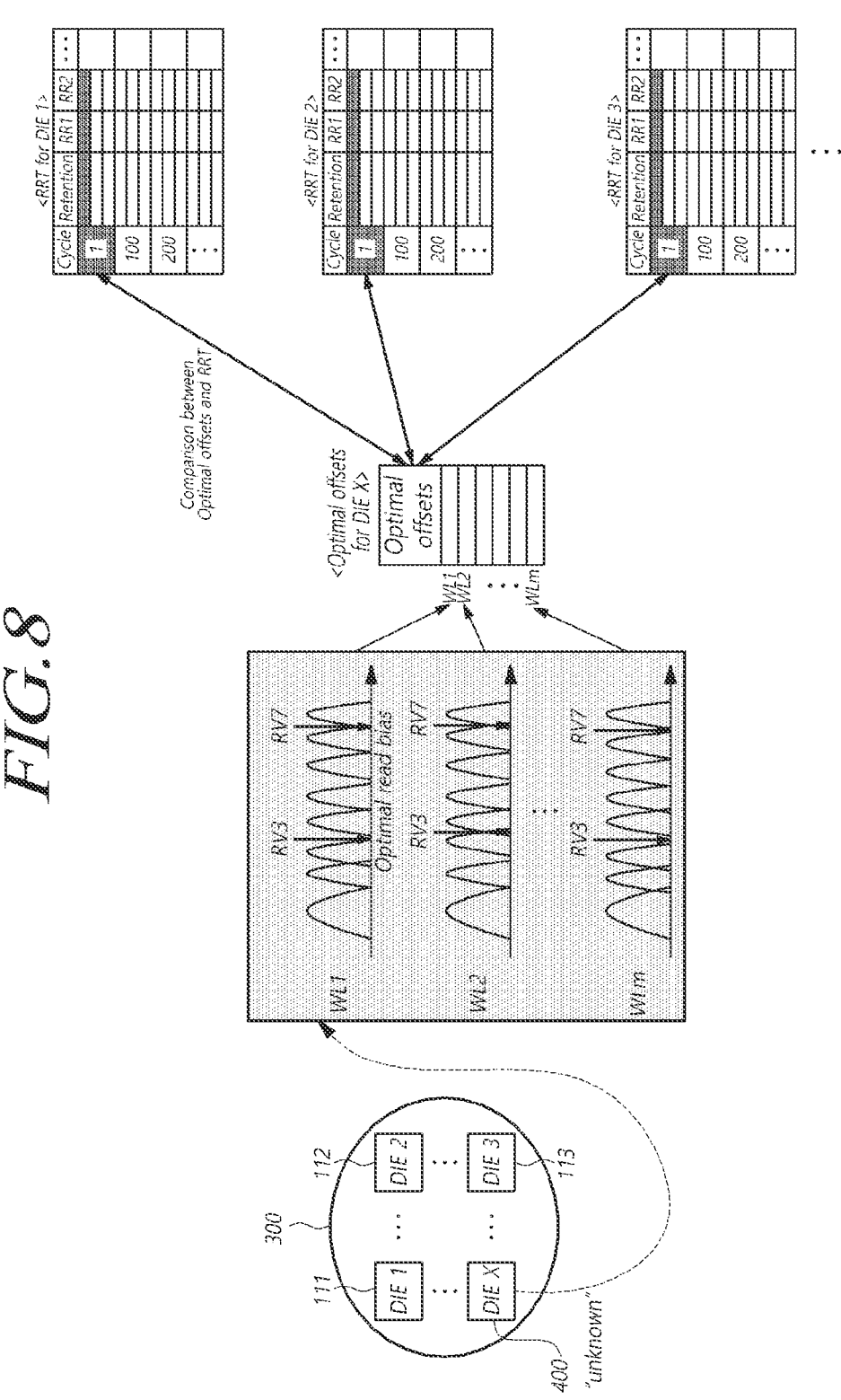

In FIG. 8, external read retry tables may be set on the basis of distributions of read voltages of the word lines WL included in the first memory 111, the second memory 112 and the third memory 113.

Each of the first memory 111, the second memory 112 and the third memory 113 may store an external read retry table based on a distribution of read voltages for sufficient word lines WL such as the at least N number of word lines WL.

The test memory 400 may secure sample data for a distribution of read voltages of the M number of word lines WL, M being less than N. Through comparison between the offset values of read voltages of the M number of word lines WL of the test memory 400 and the read retry values set in the external read retry tables included in the first memory 111, an optimal read retry table for the test memory 400 may be set.

For example, the average values or the maximum values of the Euclidean distances between the offset values of read voltages of the word lines WL of the test memory 400 and the read retry values of the external read retry tables of the first memory 111, the second memory 112 and the third memory 113, respectively, may be calculated.

The Euclidean distances between the offset values of read voltages of the word lines WL of the test memory 400 and read retry values set for the same condition in the respective external read retry tables may be calculated. For example, the Euclidean distances between M number of offset values of the test memory 400 and read retry values set for the number of cycles of 1 and a first retention period in the respective external read retry tables may be calculated.

Since the offset values of read voltages of the word lines WL of the test memory 400 are used, generation of a pre-read retry table for the test memory 400 may not be required.

Since the offset values of read voltages of the word lines WL of the test memory 400 and the read retry values of the external read retry tables of the first memory 111 are compared, an external read retry table having distribution characteristics similar to distribution characteristics of read voltages of the word lines WL of the test memory 400 may be selected.

Through comparison between the offset values of read voltages of the word lines WL of the test memory 400 and the external read retry tables set for other memories 110, an optimal read retry table for the test memory 400 may be set.

Alternatively, in an embodiment of the present disclosure, an optimal read retry table for the test memory 400 may be set without using sample data or a pre-read retry table according to a distribution of read voltages of the word lines WL of the test memory 400.

Figure 9:
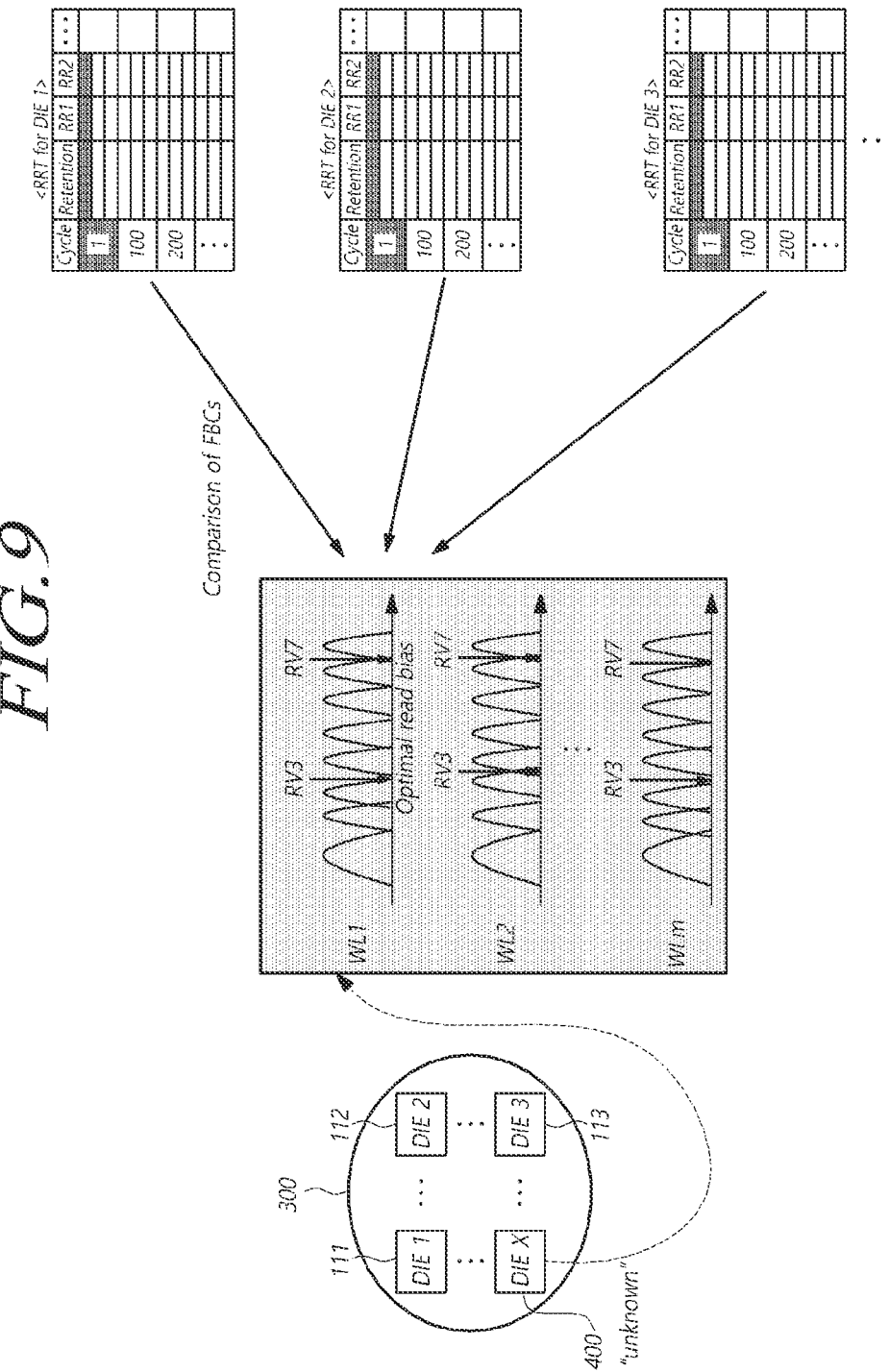

In FIG. 9, optimal read retry tables for memories 110 other than the test memory 400 may be set.

A first external read retry table may be set for the first memory 111. A second external read retry table and a third external read retry table may be set for the second memory 112 and the third memory 113, respectively.

An external read retry table set for each memory 110 may be stored in a block included in each memory 110.

By applying the external read retry tables set for other memories 110 to the test memory 400, a test for a read operation may be performed.

Since a read operation is performed by applying an external read retry table, when the read operation fails, a read retry operation based on the external read retry table may be performed. A read retry operation based on an external read retry table is performed, and fail bits when each external read retry table is applied may be counted.

An external read retry table with a lowest fail bit count (FBC) among the fail bit counts of the respective external read retry tables may be set as an optimal read retry table for the test memory 400.

Since the read retry table of the test memory 400 is set through a fail bit count, a read retry table for the test memory 400 may be set without generating sample data for a distribution of read voltages of the word lines WL included in the test memory 400 or a pre-read retry table based on the sample data.

In this way, in an embodiment of the present disclosure, by using internal data (e.g., offset values, a pre-read retry table, and so on) based on read voltages of the word lines WL of the test memory 400 and external data (e.g., external read retry tables, and so on) based on read voltages of the word lines of a plurality of external memories such as the first memory 111, the second memory 112 and the third memory 113, an optimal read retry table for the test memory 400 for which sample data according to a distribution of read voltages of the word lines WL is not sufficiently secured may be set.

The optimal read retry table for the test memory 400 may be set as an external read retry table set for any of the external memories such as the first memory 111. Alternatively, the optimal read retry table for the test memory 400 may be set as a combination of external read retry tables set for at least two external memories.

In an embodiment of the present disclosure, by comparing the distribution characteristics of read voltages of the word lines WL of the test memory 400 not with an external memory unit but with each word line group or each page included in an external memory, an optimal read retry table for the test memory 400 may be set.

For example, when using the pre-read retry table of the test memory 400, read retry values corresponding to respective word line groups in the pre-read retry table may be compared with read retry values corresponding to respective word line groups included in the first memory 111, the second memory 112 and the third memory 113.

As read retry values of another memory 110 are combined according to the similarity between read retry values, an optimal read retry table for the test memory 400 may be set.

For example, read retry values for a first word line group of the test memory 400 may be set as read retry values set for a first word line group in a first external read retry table for the first memory 111. Read retry values for a second word line group of the test memory 400 may be set as read retry values set for a second word line group in an external read retry table for the second memory 112 or the third memory 113.

In addition, when each memory cell operates as a triple-level cell, read retry values for LSB/CSB/MSB pages for each word line may be set independently, and thus, read retry values for different external memories may be set as optimal read retry values.

As such, according to an embodiment of the present disclosure, even when the sample data of read voltages of the word lines WL for the test memory 400 is not sufficient, an optimal read retry table for the test memory 400 may be provided on the basis of external read retry tables for other external memories.

Furthermore, since an optimal read retry table for the test memory 400 may be provided as read retry values of a read retry table included in another external memory are partially combined by the unit of a word line group, by the unit of a page, or by the unit of a word line, the accuracy of setting a read retry table for the test memory 400 may be increased. The efficiency of a read retry operation based on the corresponding read retry table may be improved.

The above-described setting of a read retry table for the test memory 400 based on an embodiment of the present disclosure may be performed by a device which tests the memories 110. The device which tests the memories 110 may be configured by a system such as a computer, or may be provided in the form of a circuit such as a system-on-chip.

Figure 10:
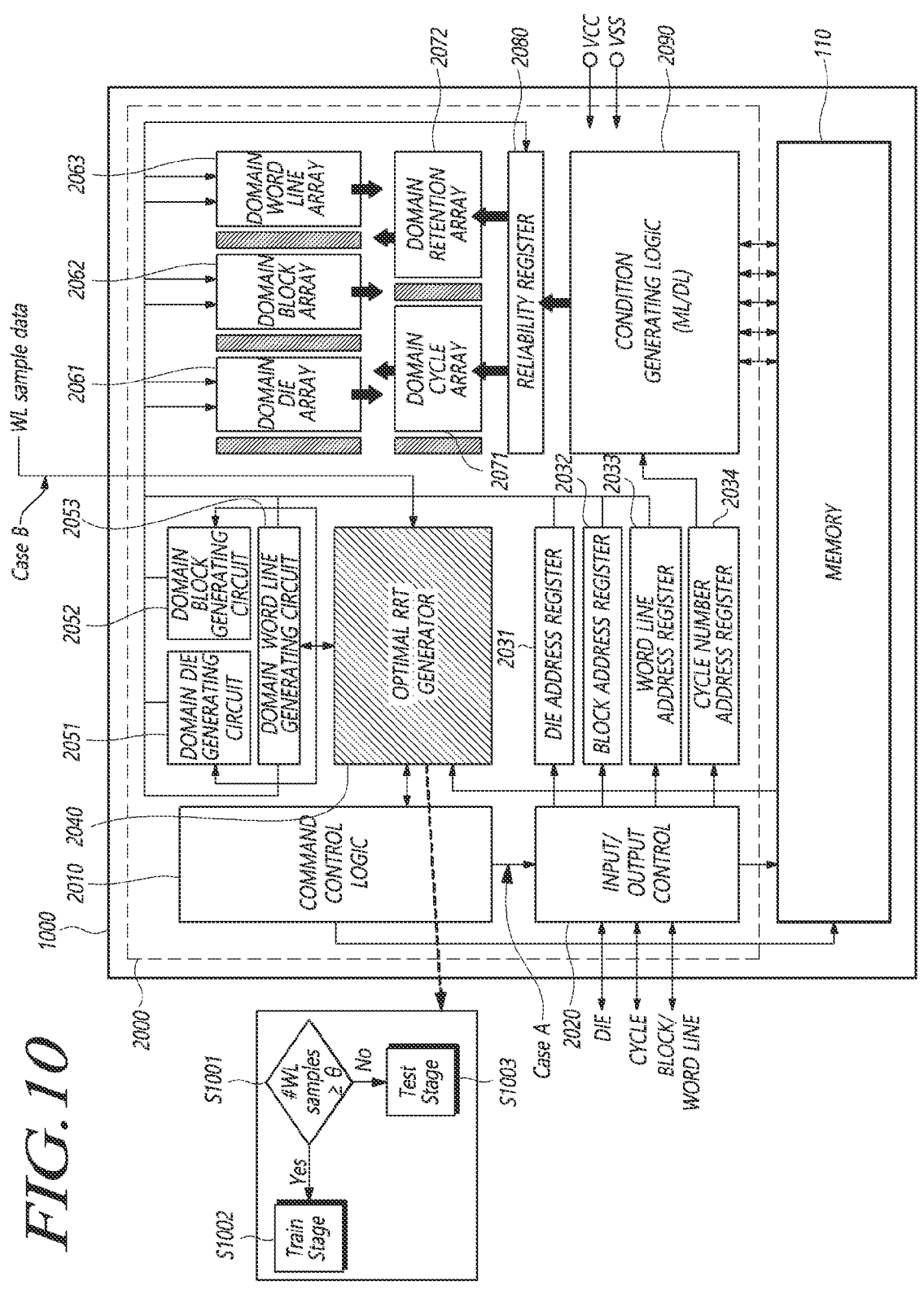
FIG. 10 is a diagram illustrating a configuration and operation scheme of a memory control device based on an embodiment of the present disclosure.

FIG. 10 is a diagram illustrating a configuration and operation scheme of a memory control device 1000 based on an embodiment of the present disclosure. FIG. 10 illustrates a device providing an optimal read retry table for a memory 110 implemented in the form of a circuit.

Referring to FIG. 10, the memory control device 1000 may perform an operation of generating an optimal read retry table for the memory 110 and storing the optimal read retry table in a block included in the memory 110. The memory control device 1000 may include a memory control circuit 2000. In some embodiments, the memory control circuit 2000 may be implemented by the configuration of the controller 120 of the storage device 100.

Describing, for example, a structure in which the memory control circuit 2000 is implemented by being included in the separate memory control device 1000, the memory 110 may be connected to the memory control device 1000 including the memory control circuit 2000. Under control of the memory control circuit 2000, an optimal read retry table for the memory 110 may be generated and may be stored in a block included in the memory 110.

Describing the basic functions of respective components included in the memory control circuit 2000, an input/output control 2020 may receive, from the outside, data on a die, a number of cycles, a memory block and a word line WL. The data received through the input/output control 2020 may be stored in a die address register 2031, a block address register 2032, a word line address register 2033 and a cycle number address register 2034.

The data stored in the cycle number address register 2034 may be transferred to a condition generating logic 2090. The condition generating logic 2090 may generate and output a condition such as a number of cycles, a retention period or a number of read disturbances. As the condition outputted by the condition generating logic 2090 passes through a reliability register 2080, a domain cycle array 2071 and a domain retention array 2072 may be selected.

On the basis of the data stored in the die address register 2031, a domain die generating circuit 2051 may select a domain die array 2061. On the basis of the data stored in the block address register 2032, a domain block generating circuit 2052 may select a domain block array 2062. On the basis of the data stored in the word line address register 2033, a domain word line generating circuit 2053 may select a domain word line array 2063.

An optimal read retry table (RRT) generator 2040 may generate a read retry table in which optimal read retry values are set for each condition, on the basis of the selected domain die array 2061, domain block array 2062, domain word line array 2063, domain cycle array 2071 and domain retention array 2072.

A command control logic 2010 may store in the memory 110 the read retry table, generated by the optimal read retry table generator 2040.

A read retry table in which optimal read retry values are set for each die, each block or each word line for each condition provided by the condition generating logic 2090 may be stored in the memory 110, and thereafter, may be used in a read retry operation for the corresponding memory 110.

Moreover, in the case where the memory control circuit 2000 is implemented as a partial configuration of the controller 120 of the storage device 100, a read retry table stored in the memory 110 may be updated by the memory control circuit 2000.

In this way, the optimal read retry table of the memory 110 may be generated and provided by the optimal read retry table generator 2040 included in the memory control circuit 2000.

The optimal read retry table generator 2040 may generate a read retry table using sufficient or insufficient sample data of read voltages of the word lines WL of the memory 110. In addition, the optimal read retry table generator 2040 may obtain sample data of read voltages from the memory 110 or from the outside. In this case, the optimal read retry table generator 2040 may include a sample data reception unit which obtains sample data of read voltages from the memory 110 or from the outside. Alternatively, the sample data reception unit may be positioned outside of the optimal read retry table generator 2040 and may be included in the memory control circuit 2000.

For example, as indicated by Case A, the optimal read retry table generator 2040 may obtain from the memory 110 sample data for read voltages of word lines WL.

The optimal read retry table generator 2040 may obtain sufficient sample data from the memory 110, and may generate a read retry table on the basis of the sufficient sample data. The generated read retry table may be stored in a block included in the memory 110, and an optimal read retry table for the corresponding memory 110 may be provided.

For another example, as indicated by Case B, the optimal read retry table generator 2040 may receive from the outside sample data of read voltages of the word lines WL included in the memory 110.

When receiving sufficient sample data from the outside, the optimal read retry table generator 2040 may generate an optimal read retry table for the memory 110 on the basis of the corresponding sample data.

When receiving insufficient sample data from the outside, the optimal read retry table generator 2040 may generate an optimal read retry table for the corresponding memory 110 through comparison with a distribution of read voltages of the word lines WL included in or the read retry table of another memory 110 for which sufficient sample data is secured.

For example, the optimal read retry table generator 2040 may compare the number of received sample data of the word lines WL with a preset value θ (S1001).

When it is determined that the number of received sample data of the word lines WL is greater than or equal to the preset value θ, the optimal read retry table generator 2040 may generate an optimal read retry table for the memory 110 through a learning method, i.e., a train stage, based on the sample data.

When it is determined that the number of received sample data of the word lines WL is less than the preset value θ, the optimal read retry table generator 2040 may generate an optimal read retry table for the memory 110 through a test method, i.e., a test stage, using the received sample data and external data based on read voltages of the word lines WL of another external memory (S1003).

In both cases where sample data for read voltages of the word lines WL included in the memory 110 is sufficient and is insufficient, an optimal read retry table on which the characteristics of the corresponding memory 110 are reflected may be provided by the optimal read retry table generator 2040 included in the memory control circuit 2000 of the memory control device 1000.

Since a read retry table on which the characteristics of each memory 110 are reflected may be provided by being stored in a block of the memory 110, the efficiency of a read retry operation using the read retry table may be increased, and thus, the performance of a read operation of the storage device 100 including the corresponding memory 110 may be improved.

Although various embodiments of the present disclosure have been described with particular specifics and varying details for illustrative purposes, those skilled in the art will appreciate that various modifications, additions and substitutions may be made based on what is disclosed or illustrated in the present disclosure without departing from the spirit and scope of the disclosed technology as defined in the following claims. Therefore, the scope of the present disclosure should not be limited to the above-described embodiments but should include the equivalents thereof.

In the above-described embodiments, all operations may be selectively performed, or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the scope of the present disclosure. It should be apparent to those skilled in the art that various modifications can be made on the basis of the technological scope of the present disclosure in addition to the embodiments disclosed herein. Furthermore, the embodiments may be combined to form additional embodiments.

What is claimed is:

1. A storage device comprising:
   a memory including a plurality of memory cells arranged between a plurality of word lines and a plurality of bit lines, and storing a read retry table; and
   a controller configured to control a read retry operation for the plurality of memory cells using the read retry table, the read retry table being determined using internal data and external data,
   wherein the internal data is determined based on read voltages of M number of word lines among the plurality of word lines, M being greater than or equal to 1, and
   wherein the external data is determined based on read voltages of at least N number of word lines included in each of a plurality of external memories, N being greater than M.

2. The storage device according to claim 1,
   wherein the read retry table is determined based on a result of comparing a read voltage of a pth word line of the M number of word lines with a read voltage of a qth word line of the at least N number of word lines, and
   wherein a layer at which the pth word line is disposed in the memory is the same as a layer at which the qth word line is disposed in each of the plurality of external memories.

3. The storage device according to claim 1, wherein the read retry table is set based on a result of comparison between read voltages of the M number of word lines and a plurality of external read retry tables set based on read voltages of the at least N number of word lines.

4. The storage device according to claim 1, wherein the read retry table is set based on a result of comparison between a pre-read retry table and a plurality of external read retry tables, and
   wherein the pre-read retry table is determined based on read voltages of the M number of word lines, and
   the plurality of external read retry tables is determined based on read voltages of the at least N number of word lines.

5. The storage device according to claim 1, wherein the read retry table is determined based on a fail bit count of the memory according to a read retry operation performed using a plurality of external read retry tables set based on read voltages of the at least N number of word lines.

6. The storage device according to claim 1, wherein the read retry table is the same as one of external read retry tables stored in the plurality of external memories, respectively.

7. The storage device according to claim 1, wherein the read retry table is the same as a first external read retry table stored in a first external memory among the plurality of external memories, and is different from a second external read retry table stored in a second external memory among the plurality of external memories.

8. The storage device according to claim 7, wherein a distribution of read voltages of the plurality of word lines included in the memory is different from a distribution of read voltages of a plurality of word lines included in the first external memory.

9. The storage device according to claim 1, wherein a first part of the read retry table is the same as a part of a first external read retry table stored in a first external memory among the plurality of external memories, and a second part of the read retry table is the same as a part of a second external read retry table stored in a second external memory among the plurality of external memories.

10. The storage device according to claim 1, wherein each of the plurality of external memories includes a block in which an external read retry table determined based on sample data according to a distribution of read voltages of the at least N number of word lines is stored.

11. The storage device according to claim 1, wherein the read retry table includes at least one read retry value determined for each of a plurality of first conditions and a plurality of second conditions corresponding to each of the plurality of first conditions.

12. The storage device according to claim 10, wherein the at least one read retry value is determined for a word line group including at least two word lines among the plurality of word lines.

13. A storage device comprising:
a first memory including a plurality of first word lines, and a block in which a first read retry table is determined based on read voltages of M number of first word lines among the plurality of first word lines which are stored, M being greater than or equal to 1; and
a second memory including a plurality of second word lines, and a block in which a second read retry table is determined based on read voltages of at least N number of second word lines among the plurality of second word lines which are stored, N being greater than M.

14. The storage device according to claim 13, wherein the first read retry table is determined using internal data and external data,
wherein the internal data is determined based on read voltages of the M number of first word lines,
and wherein the external data is determined based on read voltages of at least N number of word lines included in each of a plurality of external memories.

15. The storage device according to claim 13, further comprising:
a controller configured to control the first memory and the second memory, control a read retry operation for the first memory using the first read retry table, and control a read retry operation for the second memory using the second read retry table.

16. A memory control device comprising:
a sample data reception unit configured to receive, from a memory or the outside, sample data for read voltages of K number of word lines, K being greater than or equal to 1; and
an optimal read retry table generator configured to generate a read retry table for the memory including the K number of word lines on the basis of the sample data,
wherein, when K is less than a preset number, the optimal read retry table generator generates the read retry table by comparing the sample data for the read voltages of the K number of word lines with read voltages of word lines, a number of which is greater than or equal to the preset number, or
by comparing the sample data for read voltages of the K number of word lines with the read retry table generated based on read voltages of word lines, a number of which is greater than or equal to the preset number.

17. The memory control device according to claim 16, wherein, when K is greater than or equal to the preset number, the optimal read retry table generator generates the read retry table for the memory based on a distribution of the sample data for the read voltages of the K number of word lines.

* * * * *